(12) United States Patent
Palsson et al.

(10) Patent No.: US 8,950,041 B2
(45) Date of Patent: Feb. 10, 2015

(54) SUPPLEMENTAL WHEEL HOLDER

(75) Inventors: Ingemar Palsson, Lund (SE); Sven Asbo, Allerum (SE); Erik Backman, Landskrona (SE)

(73) Assignee: ASSA Abloy Entrance Systems AB, Landskrona (SE)

( * ) Notice: Subject to any disclaimer, the term of this patent is extended or adjusted under 35 U.S.C. 154(b) by 52 days.

(21) Appl. No.: 13/808,862

(22) PCT Filed: Jun. 8, 2011

(86) PCT No.: PCT/EP2011/059512
§ 371 (c)(1),
(2), (4) Date: Mar. 27, 2013

(87) PCT Pub. No.: WO2012/004077
PCT Pub. Date: Jan. 12, 2012

(65) Prior Publication Data
US 2013/0205541 A1    Aug. 15, 2013

Related U.S. Application Data

(60) Provisional application No. 61/412,274, filed on Nov. 10, 2010.

(30) Foreign Application Priority Data

Jul. 7, 2010 (SE) ...................................... 1050746

(51) Int. Cl.
*E05D 15/00* (2006.01)
*E05D 15/06* (2006.01)
*B23P 6/00* (2006.01)

(52) U.S. Cl.
CPC .......... *E05D 15/063* (2013.01); *E05D 15/0634* (2013.01); *B23P 6/00* (2013.01);

(Continued)

(58) Field of Classification Search
USPC .................... 16/90, 91, 94 R, 96 R, 95 R, 97, 16/101–107, 87 R, 84 R, 87.6 R, 87.8, 273; 160/185, 199; 49/404, 409, 410, 411, 49/412, 420, 421–425, 453, 455
See application file for complete search history.

(56) References Cited

U.S. PATENT DOCUMENTS 1,066,236 A    7/1913    Wells
1,930,379 A    10/1933    Bennett
(Continued)

FOREIGN PATENT DOCUMENTS

AU    779 340 B2    1/2005
DE    564572    11/1932
(Continued)

OTHER PUBLICATIONS

International Search Report prepared by the European Patent Office on Sep. 21, 2011, for International Application No. PCT/EP2011/059512.

(Continued)

*Primary Examiner* — Chuck Mah
(74) *Attorney, Agent, or Firm* — Sheridan Ross P.C.

(57) ABSTRACT

The present invention relates to the field of sliding door systems. The invention relates to a second wheel holder (800) enabling using a flexible number of wheels in a wheel carriage (300) for a sliding door resting in sliding track (106). The second wheel holder (800) comprises one attachment means (810) adapted to be removably attached to the first wheel connection means (340) and at least two second wheel connection means (820) each adapted to connect one wheel (330). The invention also relates to a method for exchanging the wheels (330) and of a wheel carriage (300), by lowering a door panel and replacing the wheels, by removing the second wheel holder (800), while the wheel carriage (300) is resting in the sliding track (106).

17 Claims, 12 Drawing Sheets

(52) U.S. Cl.
CPC ..... *E05Y 2201/218* (2013.01); *E05Y 2201/688* (2013.01); *E05Y 2600/52* (2013.01); *E05Y 2800/426* (2013.01); *E05Y 2900/132* (2013.01)
USPC ........... 16/102; 16/91; 16/105; 16/107; 16/97

(56) References Cited

U.S. PATENT DOCUMENTS

| | | | | |
|---|---|---|---|---|
| 2,940,113 | A | * | 6/1960 | Riser ............................... 16/105 |
| 2,999,267 | A | | 9/1961 | Sterling et al. |
| 3,041,657 | A | * | 7/1962 | McNinch ........................ 16/105 |
| 3,208,109 | A | * | 9/1965 | Buck, Jr. ........................ 49/425 |
| 3,670,357 | A | * | 6/1972 | Steigerwald .................... 16/105 |
| 4,483,045 | A | | 11/1984 | Shelton et al. |
| 4,633,615 | A | * | 1/1987 | Moose ............................ 49/425 |
| 4,899,493 | A | | 2/1990 | Baumgarten |
| 5,018,306 | A | | 5/1991 | Prevot |
| 5,035,025 | A | | 7/1991 | Morris et al. |
| 5,950,279 | A | * | 9/1999 | Chaput ............................ 16/105 |
| 6,021,547 | A | * | 2/2000 | Stagoll ............................ 16/105 |
| 6,185,784 | B1 | * | 2/2001 | Gamperle ........................ 16/99 |
| 6,321,413 | B1 | | 11/2001 | Zingg |
| 6,698,138 | B1 | | 3/2004 | Lin |
| 2002/0007760 | A1 | * | 1/2002 | Brandt .......................... 104/182 |
| 2005/0011041 | A1 | * | 1/2005 | Ness ............................... 16/105 |
| 2007/0017065 | A1 | * | 1/2007 | Hutnik et al. .................... 16/91 |
| 2007/0130725 | A1 | * | 6/2007 | Ness ............................... 16/105 |
| 2009/0019665 | A1 | * | 1/2009 | Kelley ............................ 16/105 |

FOREIGN PATENT DOCUMENTS

| | | |
|---|---|---|
| DE | 1559927 | 3/1970 |
| DE | 202006007326 | 9/2006 |
| EP | 0563015 | 9/1993 |
| EP | 563015 A1 * | 9/1993 |
| GB | 526287 | 9/1940 |
| GB | 990057 | 4/1965 |
| WO | WO 2009081240 | 7/2009 |
| WO | WO 2010/019692 A1 | 2/2010 |

OTHER PUBLICATIONS

Written Report prepared by the European Patent Office on Sep. 21, 2011, for International Application No. PCT/EP2011/059512.
U.S. Appl. No. 13/808,879, filed Jan. 7, 2013, Palsson et al.
International Search Report prepared by the European Patent Office on Sep. 14, 2011, for International Application No. PCT/EP2011/059521, 4 pages.
Written Opinion prepared by the European Patent Office on Sep. 14, 2011, for International Application No. PCT/EP2011/059521, 5 pages.

* cited by examiner

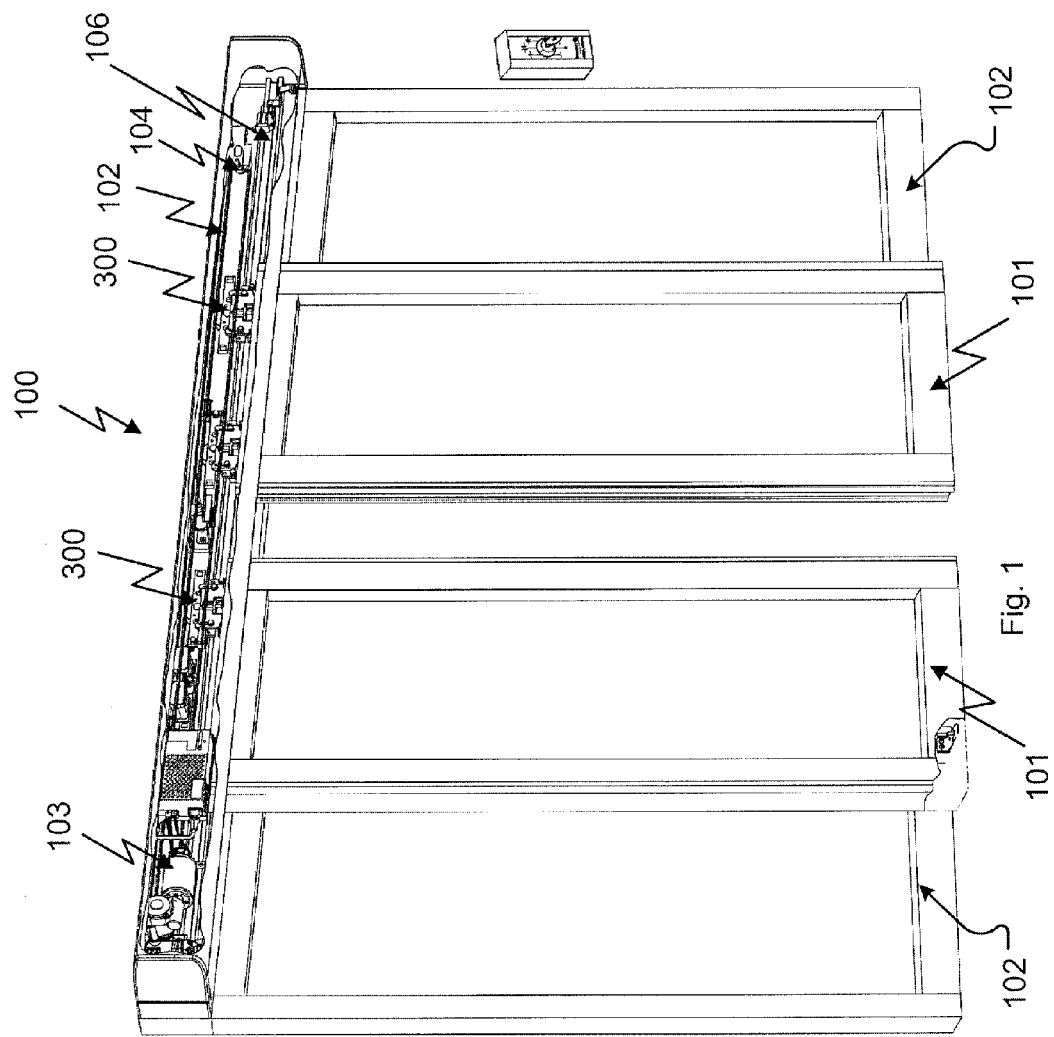

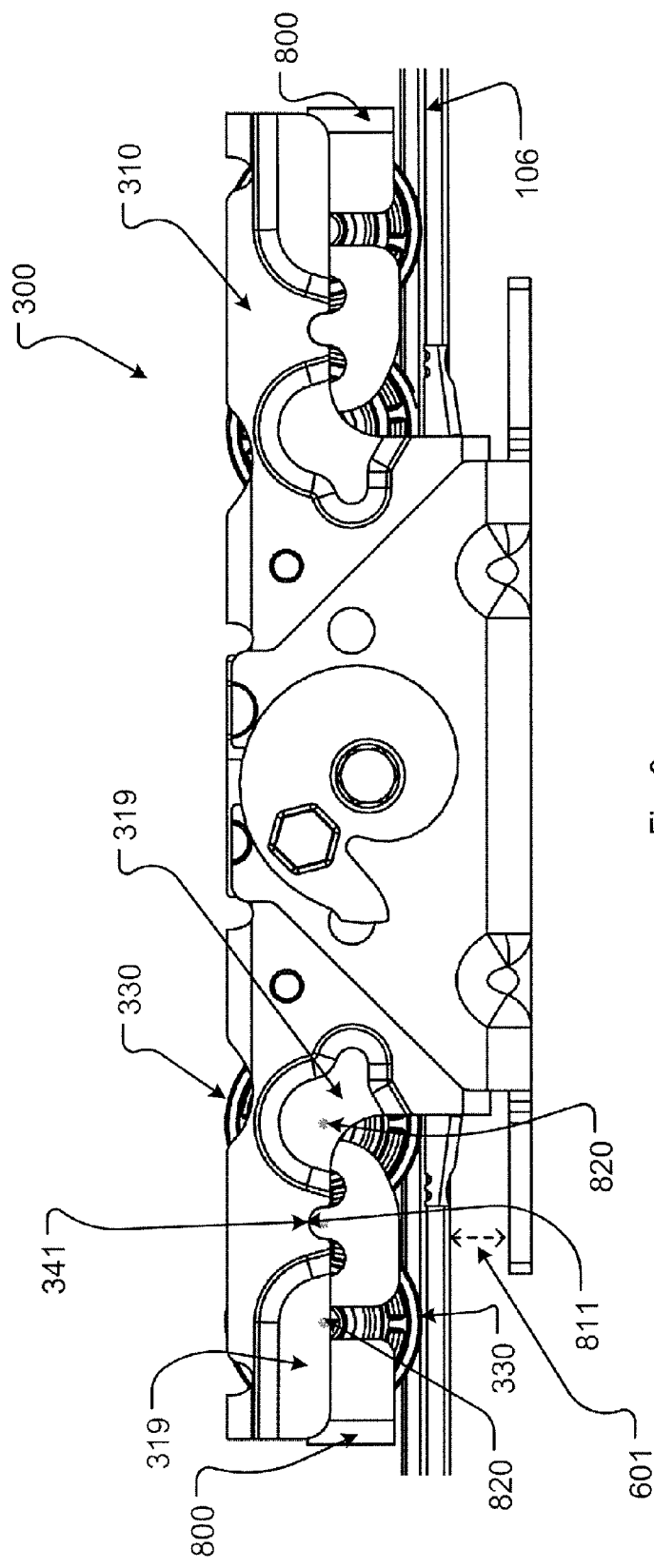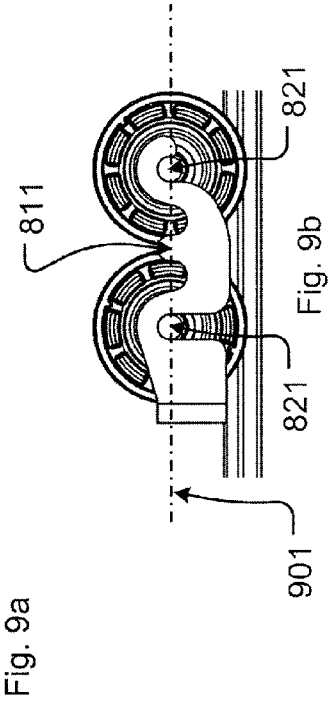
Fig. 9a
Fig. 9b

SUPPLEMENTAL WHEEL HOLDER

CROSS REFERENCE TO RELATED APPLICATIONS

This application is a national stage application under 35 U.S.C. 371 and claims the benefit of PCT Application No. PCT/EP2011/059512 having an international filing date of Jun. 8, 2011, which designated the United States, which PCT application claimed the benefit of U.S. Provisional Application No. 61/412,274 filed Nov. 10, 2010, and Swedish Patent Application No. 1050746-5 filed Jul. 7, 2010, the disclosures of each of which are incorporated herein by reference.

TECHNICAL FIELD

The present invention relates to the field of sliding door systems and more particularly to a device and a method enabling using a variable number of wheels in a wheel carriage in such a system.

BACKGROUND

Automatic doors e.g. sliding doors or revolving doors are commonly used e.g. in commercial, health care and residential applications.

A sliding door system typically comprises door panels attached to wheel carriages running in a sliding track. Due to the high number of repetitions of opening and closing and the considerable weight of the door panels, the wear on the wheels and the wheel carriage in such an application is considerable.

Therefore, metal wheels are often used in this type of applications. However, metal wheels may cause noise when running in the track. An alternative is to use plastic wheels, which are cheaper. A problem with using plastic wheels is that they need to be replaced more frequently and that the procedure of replacing the wheels is complicated and often implies readjustment of the complete door panel. Therefore, wheel replacement typically needs to be assisted by professional staff.

Different doors put different requirements on the wheels and the wheel carriage, due to e.g. varying weight. The average weight of a door panel may be about 60 kg. However, in some application door panels weighing 200-300 kg are used. Different doors put different requirements on the wheels and the wheel carriage. This may cause problems such that the door is not sliding smoothly in the track or that the wheels are worn out very quickly.

Another problem of sliding door systems is that the height adjustment is complicated and thus often inaccurate. Height adjustment typically needs to be performed each time the door has been removed from the sliding track e.g. in connection to wheel exchange.

Hence, it is a general problem that the wheels of a sliding door system are worn out and that the existing methods for exchangeing the wheels of a wheel carriage in a sliding door system are inflexible, expensive and time consuming. Therefore, finding a solution, which mitigates or alleviates the above-mentioned drawbacks, would be most welcome.

SUMMARY OF THE INVENTION

With the above description in mind, then, one aspect of the present invention is to provide a method and an arrangement which seeks to mitigate, alleviate, or eliminate one or more of the above-identified deficiencies in the art and disadvantages singly or in any combination.

According to one aspect of the invention, it provides for a second wheel holder, which enables using a variable number of wheels in a wheel carriage in a sliding door system. The invention also relates to and method for exchanging wheels when using a second wheel holder.

More specifically the invention relates to a second wheel holder for a wheel carriage holding a sliding door running in a sliding track, said wheel carriage comprising at least two first wheel connection means each adapted to connect one wheel, characterised in that it comprises:
  one attachment means adapted to be removably attached to one of the first wheel connection means and
  at least two second wheel connection means each adapted to connect one wheel.

The invention also relates to a second wheel holder, wherein each second wheel connection means comprises two connection points, adapted to be connected to opposite sides of the wheel.

The invention also relates to a second wheel holder, wherein the second wheel connection means and the attachment means are horizontally aligned.

The invention also relates to a second wheel holder, wherein the attachment means comprises at least one protrusion in the upper side of the second wheel holder with a width corresponding to the thickness of a wheel shaft.

The invention also relates to a second wheel holder, wherein the second wheel connection means comprise at least one recess in the lower side of the second wheel holder with a width corresponding to a thickness of a wheel shaft.

The invention also relates to a second wheel holder, wherein the second wheel holder further comprises:
  one intermediate wall, comprising two ends, and
  two parallel sidewalls,
wherein each end of the intermediate wall is connected to a sidewall.

The invention also relates to a second wheel holder, wherein the attachment means comprises a protrusion on the upper side of each sidewall with a width corresponding to the thickness of a wheel shaft.

The invention also relates to a second wheel holder, wherein the each wheel second connection means comprises a recess in the lower side of each sidewall with a width corresponding to the thickness of a wheel shaft.

The invention also relates to a second wheel holder having a U-shape

The invention also relates to a second wheel holder, wherein the second wheel holder is adapted to attach the wheels by the gravitation force generated by a door panel attached to the wheel carriage.

The invention also relates to a second wheel holder, wherein the second wheel holder is adapted to be attached to the wheel carriage by the gravitation force generated by a door panel attached to the wheel carriage.

The invention also relates to a second wheel holder, wherein the second wheel holder is made from one piece of metal sheet.

The invention also relates to wheel carriage for a sliding door resting in sliding track, comprising:
  a wheel holder comprising at least two first wheel connection means, each adapted to be removably connect one wheel,
  a door carrier, movably connected to the wheel holder and adapted to be attached to the upper part of a door panel, and a second wheel holder as described above.

The invention also relates to wheel carriage, wherein the first and the second wheel connection means comprises two connection points adapted to be connected on opposite sides of the wheel.

The invention also relates to wheel carriage, wherein the second wheel holder is adapted to be attached to the wheel holder and the wheel shaft by the gravitation force of a door panel attached to the door carrier.

The invention also relates to a method for exchanging wheels of a wheel carriage resting in a sliding track, said wheel carriage comprising one wheel holder, at least one secondary wheel holder, at least two wheels and, and one door carrier; wherein the wheel holder comprises at least two first wheel connection means removably connected to the wheels or the second wheel holder at two connection points, wherein the connection points are connected on opposite sides of the wheel or the second wheel holder; and wherein the door carrier is attached to a door panel comprising the steps:

lowering the door panel in a vertical direction to such an extent that the wheels are removable from the wheel holder, removing the at least one second wheel holder and the at least two wheels, replacing at least one wheel, inserting the at least one second wheel holder and at least two wheels, elevating the door panel so that the weight of the door panel rests in the sliding track.

The invention also relates to a method for exchanging wheels of a wheel carriage resting in a sliding track, said wheel carriage comprising one wheel holder, at least two wheels and one door carrier; wherein the wheel holder comprises at least two first wheel connection means removably connected to a wheel at two connection points, wherein the connection points are connected on opposite sides of the wheel; and wherein the door carrier is attached to a door panel, comprising the steps:

lowering the door panel in a vertical direction to such an extent that the wheels are removable from the wheel holder, removing at least one wheel, inserting at least one second wheel holder and at least two wheels, elevating the door panel so that the weight of the door panel rests in the sliding track.

The invention is defined by the independent claims. Embodiments are set forth by the dependent claims and by the following description and the drawings.

One effect of the invention is that the second wheel holder enables using a variable number of wheels in a wheel carriage, without any modification to the wheel carriage. Hence, the wear on the wheels will decrease as the force is divided between a more of wheels. Thereby, the wheels do not have to be exchanged that often.

Another effect is that the number of wheels is flexible during the lifetime of the wheel carriage. For example if a heavy door does not slide smoothly after installation with two wheels in each wheel carriage, then the number of wheels may be increased in order to make the door slide smoothly.

Another advantage is that the manufacturer may use the same wheel carriage model for different types of doors, e.g. light and heavy doors, and adopt the number of wheels according to a specific door type.

Another effect is that plastic wheels could be used also for heavy doors, where plastic wheels are normally too weak, e.g. as the number of wheels may be increased.

Another effect is that the second wheel holder contains only one piece and thereby is cheap and easy to manufacture.

Another effect is that the same type of wheels could be used independently on if the second wheel holder is used or not.

Another effect is that the wheels can be easily exchanged.

Another effect is that the use of a second wheel holder implies that the wheel carriage is stabilised in a horizontal direction, which may be advantageous if the door is e.g. exposed to heavy wind.

BRIEF DESCRIPTION OF THE DRAWINGS

Further objects and features, of the present invention will appear from the following detailed description of embodiments of the invention, wherein the embodiments will be described in more detail with reference to the accompanying drawings, in which:

FIG. 1 illustrates a sliding door system.

FIG. 9a-b illustrates a second wheel holder mounted in a wheel carriage resting in a sliding track.

Figure 2A:
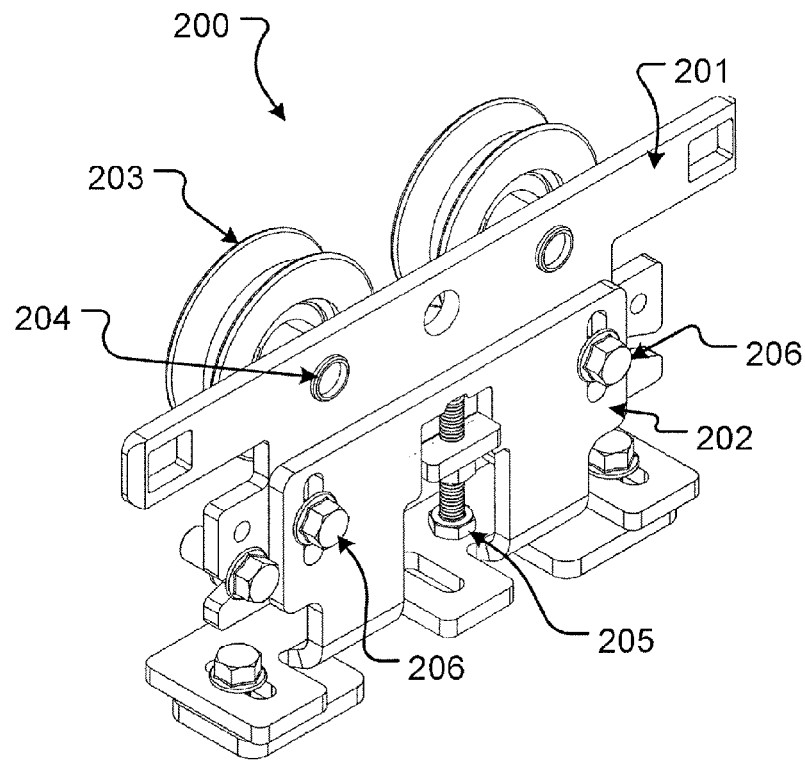
FIG. 2a-2b illustrates a wheel carriage according to prior art.

It should be added that the following description of the embodiments is for illustration purposes only and should not be interpreted as limiting the invention exclusively to these embodiments/aspects.

DETAILED DESCRIPTION

Embodiments of the present invention relate, in general, to the field of automatic sliding doors and, in particular, to a second wheel holder for a wheel carriage of such a system. The invention also relates to a method for exchanging the wheels of a wheel carriage with a second wheel holder. One example of such a system is Besam™ Sliding Door Operator UniSlide.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

FIG. 1 shows an overview of a sliding door system 100. The sliding door system 100 comprises two door panels 101 and two surrounding walls 102. The door panels 101 are connected to wheel carriages 300 and hangs in a sliding track 106. The guiding at the bottom is carried out by means of floor guides (not shown).

The sliding door system 100 further comprises drive means comprising a tooth belt 102, a drive wheel 104 and an electrical motor 103. The electrical motor 103 transmits movement to the door panels 101 by the drive means. The tooth belt 102 is connected to the wheel carriages 300 attached to the upper side of the door panels 101.

Figure 2B:
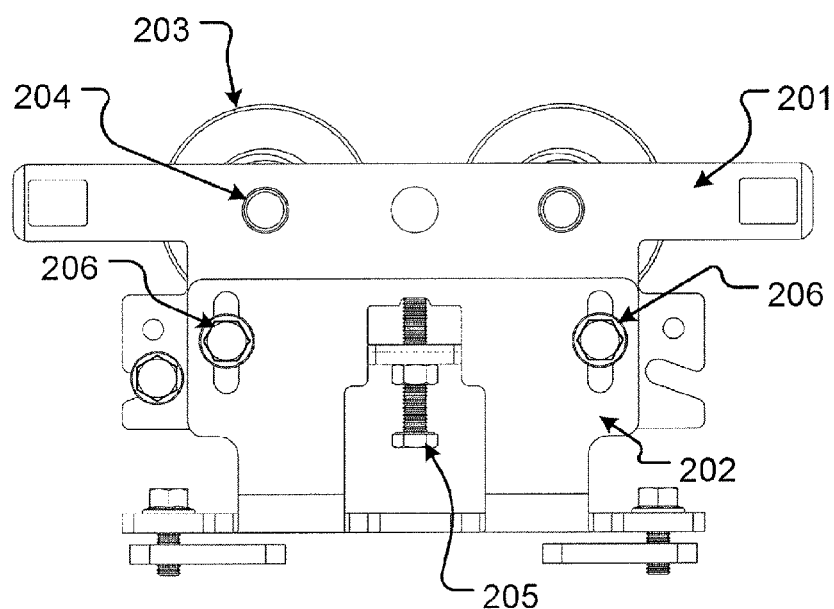

FIG. 2*a*-*b* shows a wheel carriage 200 according to prior art. The wheel carriage 200 comprises a wheel holder 201, a door carrier 202, a pair of wheels 203, bolts 204, height adjustment arrangement means 205 and locking screws 206. The door carrier 202 is adapted to be attached to the upper side of a door blade 101. The wheel holder 201 holds the wheels 203 adapted to run in the sliding track 106. The wheel holder 201 is slidably attached to the door carrier 202, and locked in a fixed position with the locking screws 206. According to prior art the wheel shafts holding the wheels are bolted, with bolts 204, to the wheel holder 201, which has a planar shape.

In order to exchange the wheels 203 of the wheel carriage 200, when they are worn out or broken, the door needs to be demounted. The entire wheel holder 201 is then removed from the door bracket 202. The entire wheel holder 201 is then exchanged and the door 101 is finally remounted and height adjusted.

A wheel carriage will now be described with references made to the FIG. 3-7.

Figure 3A:
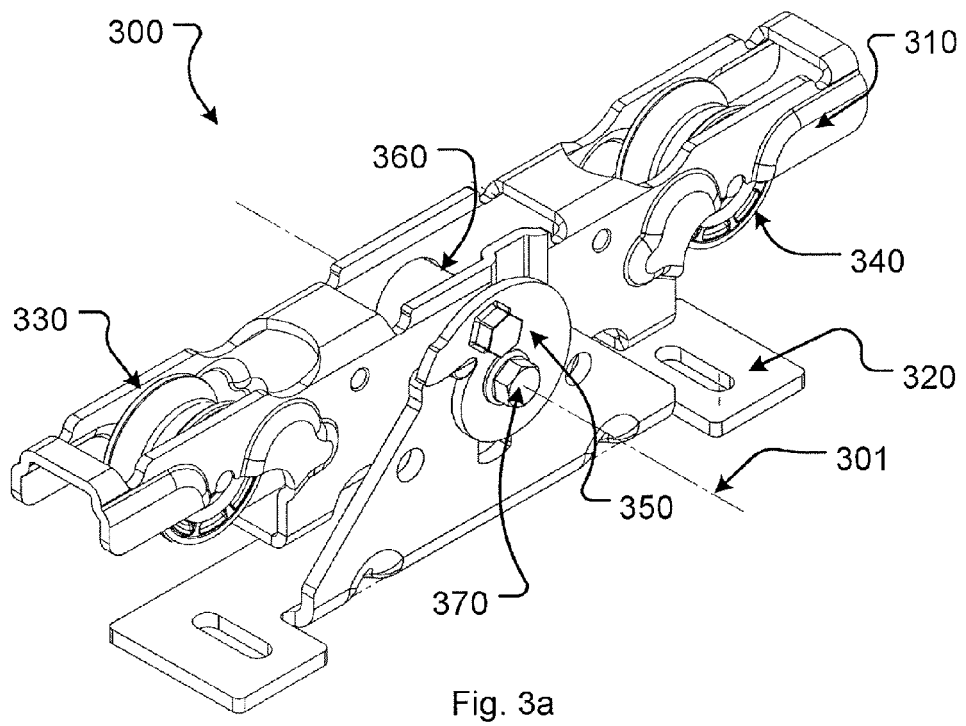
FIG. 3a-b illustrates a wheel carriage.
Figure 3B:
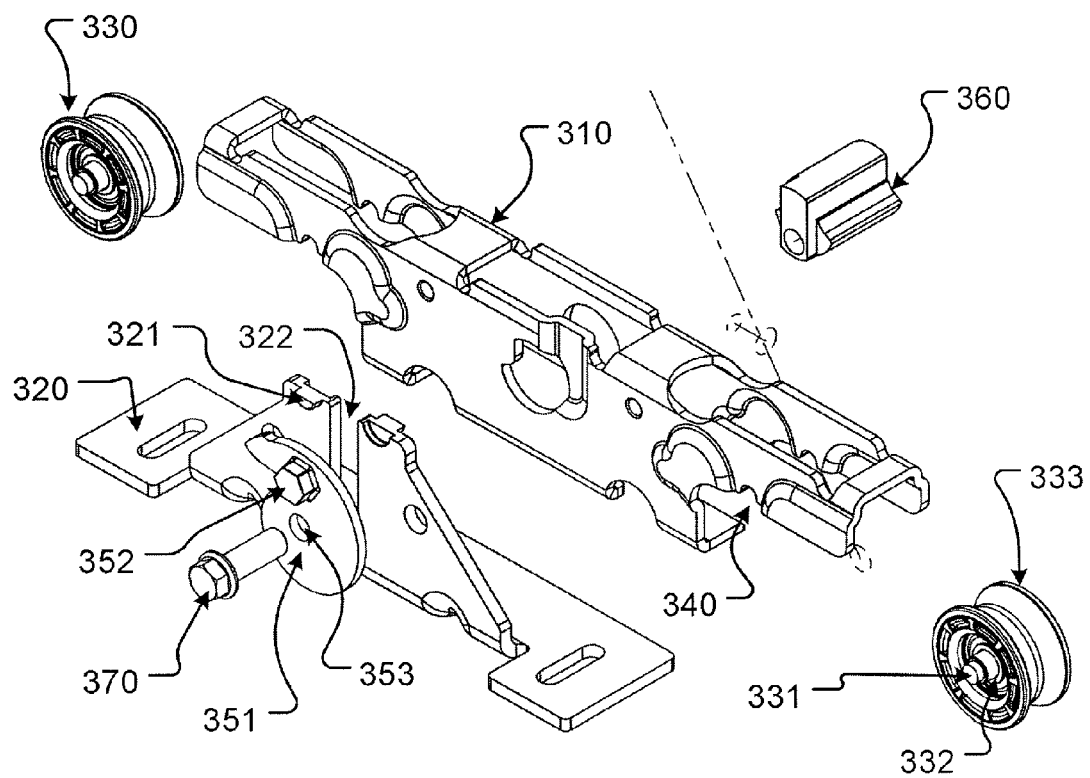

FIG. 3*a*-*b* illustrates a wheel carriage 300. The wheel carriage 300 will now be described in more detail in particular referring to FIGS. 3*a* and 3*b*. The wheel carriage 300 comprises a door carrier 320, wheels 330, height adjustment means 350, a centre shaft 360, a fixation screw 370 and a wheel holder 310, comprising two first wheel connection means 340.

Figure 4A:
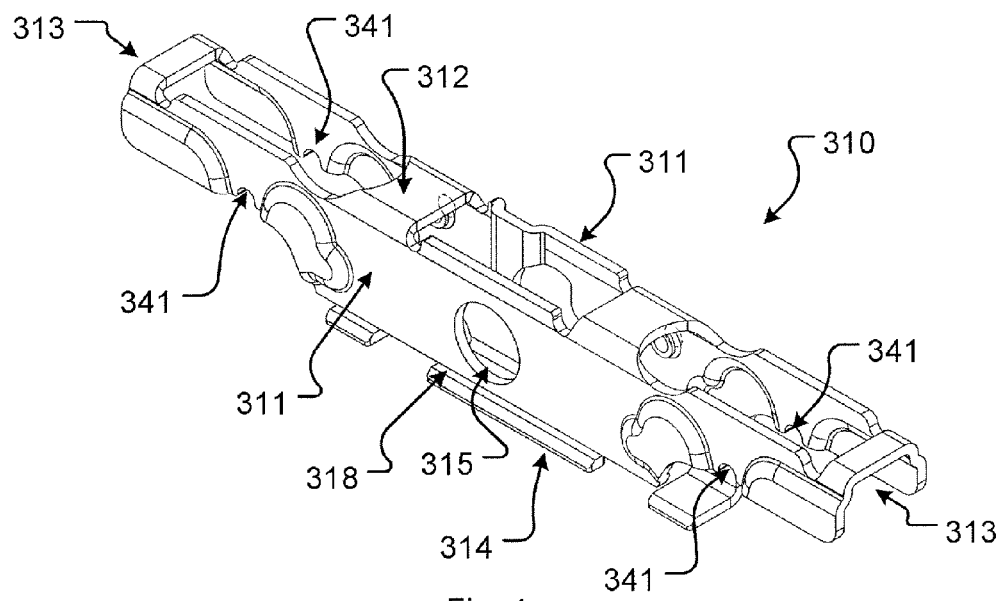
FIGS. 4a-c illustrates a wheel holder.
Figure 4B:
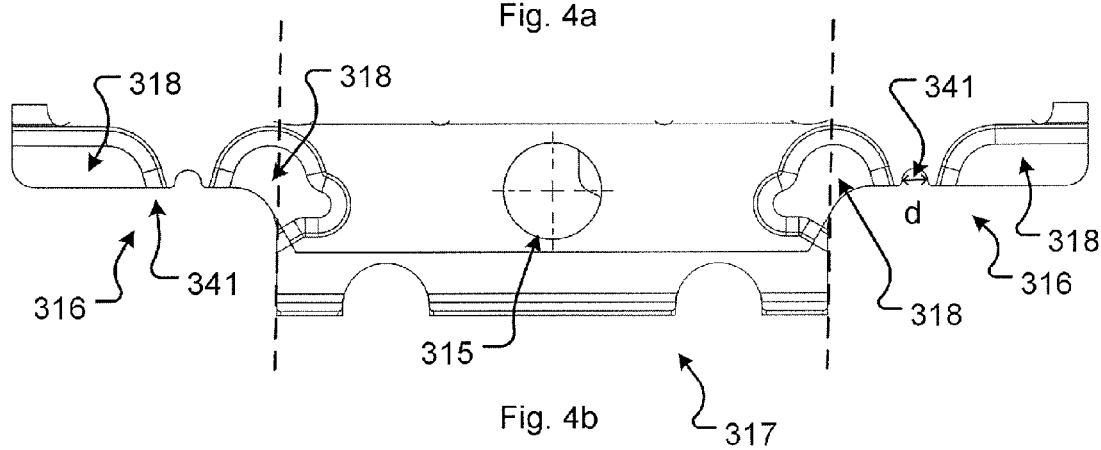
Figure 4C:
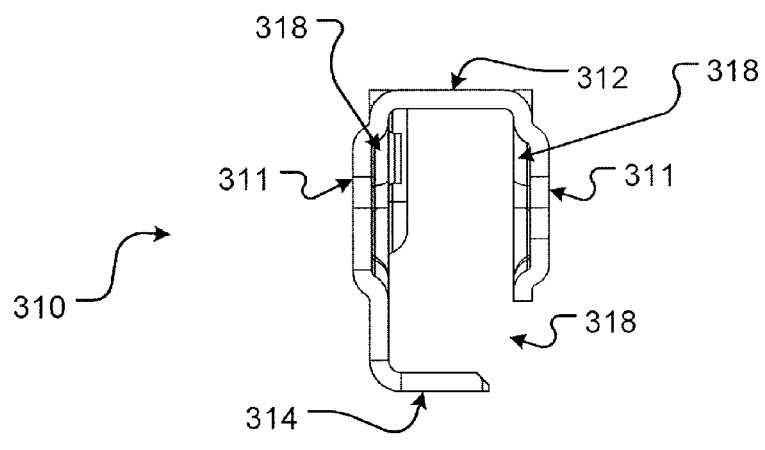

The wheel holder 310, disclosed in detail in FIGS. 4*a*-*c*, is an arrangement for holding the wheels 330. FIG. 4*a* illustrates the wheel holder 310 in more detail. The wheel holder 310 is made from a metal sheet. The metal sheet is bent into a hollow boxlike shape. The wheel holder 310 has an oblong shape comprising two long sides 311, an upper side 312, two short sides 313 and a lower side 314. An upper edge of each long side 311 is attached along each side of the upper side 312 of the wheel holder 310. One of the long sides 311 has an opening 318 adapted to receive the sliding track 106, when the wheel carriage 300 is positioned in a sliding track 106. The opening 318 stretches all the way from one short side 313 to the other. See also FIG. 4*c* showing the wheel holder 310 seen from the short side 313.

FIG. 4*b* shows the wheel holder seen from the long side. The long sides 311 of the wheel holder 310 have one tapering part 316 at each end and a wider part 317 at the middle. The wider part 317 stretches below the sliding track 106, when the wheel carriage 300 is positioned in the sliding track 106. Hence, the wider part of the wheel holder has a C-like shape seen from the short side 313. Each long side 311 further comprises an aperture 315 for receiving a centre shaft 360. The aperture 315 is positioned at the middle portion of each long side 311.

The short side 313 of the wheel holder 310 is open, as disclosed in FIG. 4*c*. The lower side 314 of the wheel holder is also partly open. In particular, the end parts of the lower side 314 are open to make room for the wheels 330. Thereby, the long sides 311 and the upper side 312 form a reversed U-shape, at the tapering part 316 of the wheel holder 310, when seen from the short side 313. The short sides 313 may also be partly solid with an aperture big enough to enable removal of a wheel 330 trough the short side 313, while the wheel carriage 300 is positioned in a sliding track 106.

The wheels 330 comprise a wheel shaft 331, attached by a ball bearing 332, and a tyre 333, see FIG. 3*b*. The wheel holder 310 comprises two first wheel connection means 340 for connecting the wheels 330. Each first wheel connection means 340 comprises two connection points 341 positioned opposite each other at the lower side of each long side 311, see FIG. 4*a*. The connection points are positioned on opposite sides of the wheel 330, when the wheel 330 is connected. The connection points 341 are recesses 341 corresponding to the shape of the wheel shaft 331. The recesses 341 constitute two semicircles in the lower edges of each long side 311, see FIG. 4*b*. Each recess 341 is adapted to receive one end of a wheel shaft 331. Hence, the width (d) of each recess 341 corresponds to the width of the wheel shaft 331. The wheel shaft 331 is locked in its position by the weight of the door panel 101. The U-shape of the tapering part of the wheel holder 316 enables insertion and removal of a wheel 330, through the short side 313 of the wheel holder 310, when the wheel carriage 300 is located in the sliding track 106.

The door carrier 320 is a metal sheet bent about 90 degrees, thereby forming an L-shape, when seen from the side, see FIG. 3*b*. The horizontal part of the L is adapted to be connected to the upper side of a door panel 101. The door carrier 320 may also be integrated in the door panel 101. The vertical part of the L has attachment means 322 for slidably attaching the door carrier 320 to the wheel holder 310. The attachment means 322 is a vertical slot 322 in the vertical part of the door carrier 320, stretching downwards from the upper side the door carrier 320. The outer portions of the metal sheet are not bent in an L-shape, thereby forming an extension to the horizontal part in the opposite direction. The door carrier further comprises two knobs 321 positioned on each side of the vertical part. The knobs 321 are positioned at the upper edge of the door carrier 320. The knobs 321 are adapted to bear against the height adjustment means 350, when adjusting the height of the door.

The height adjustment means 350 comprises an excenter cam disc 351 with a key grip 352. The excenter cam disc 351 has a central aperture 353 positioned such that the distance from the center of the central aperture 353 to the edge of the excenter cam disc 351 varies.

At the mounted wheel carriage 300, see FIG. 3*a*, the vertical part of the door carrier 320 is placed in contact with one long side 311 of the wheel holder 310, such that the horizontal part of the door carrier 320 is positioned under the wheel holder 310. The excenter cam disc 351 is placed on the door carrier, such that the central aperture 315 overlaps the vertical slot 322. The centre shaft 360 is positioned in the aperture 315 of the wheel holder 310 and in the vertical slot 322 of the door carrier 320. Thereby, the centre shaft 360 is fixated to the wheel holder 310. The part of the centre shaft 360 running through the vertical slot has a width corresponding to the width of the vertical slot 322. Thereby, the door carrier 320 is slidably attached to the wheel holder 310, in a vertical direction. A screw 306 runs through the central aperture of the excenter cam disc 351 and through the centre shaft 360 and fixates the excenter cam disc 351 and the door carrier 320 in a wished position in relation to the centre shaft 360.

Figure 5A:
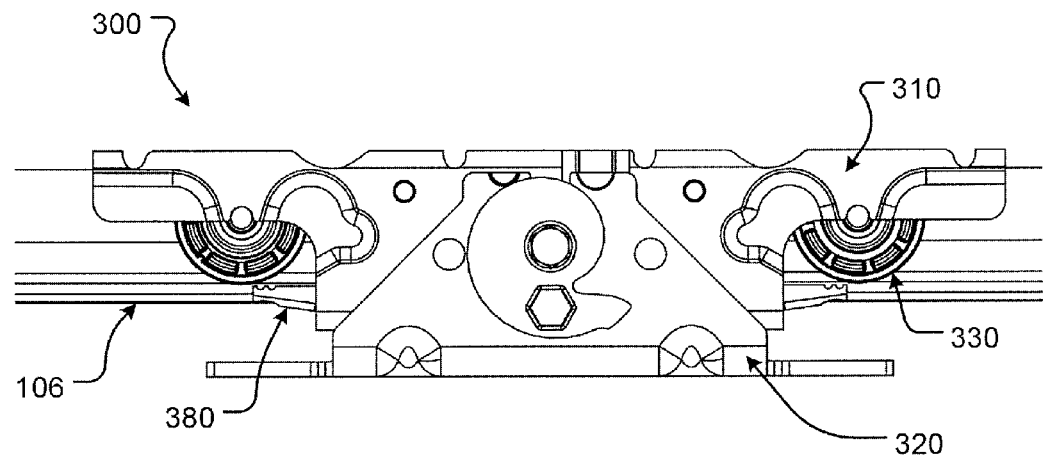
FIGS. 5a-c illustrates a wheel carriage resting in a sliding track.
Figure 5B:
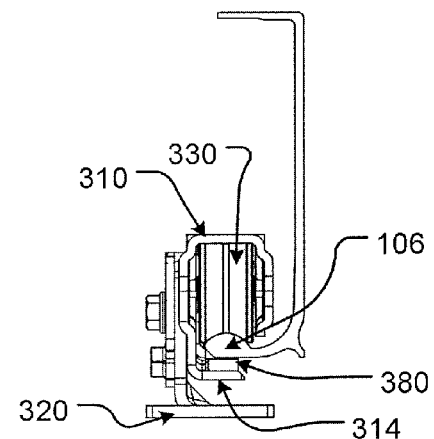
Figure 5C:
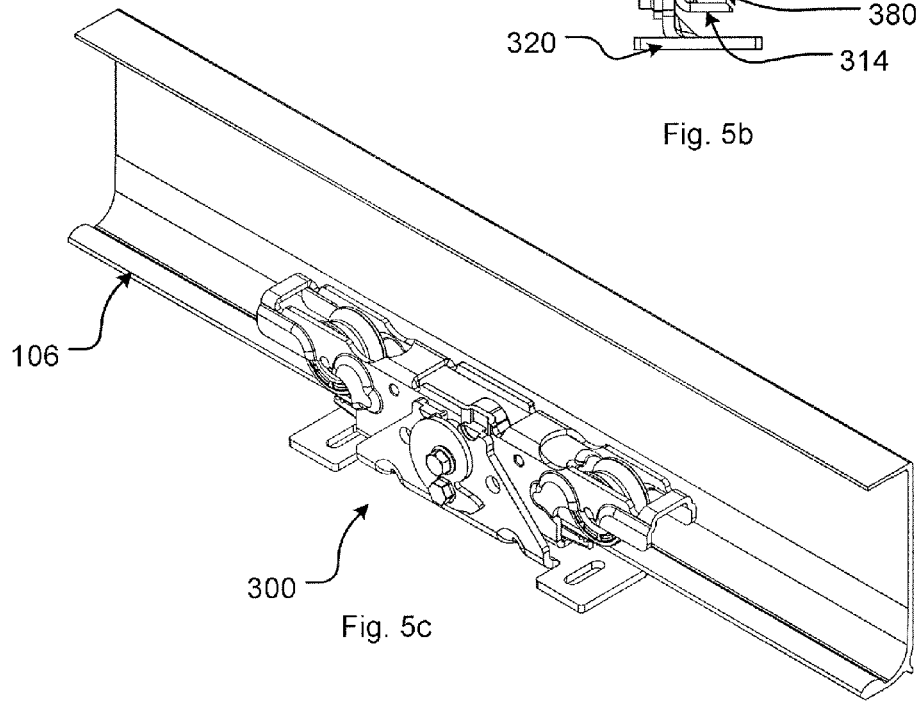

FIGS. 5*a*-*c* illustrates the wheel carriage 300 positioned in a sliding track 106. The wheels 330 rests on the track 106 and the weight of the door panel 101 is carried by the sliding track 106. The wheel holder 310 is positioned around the sliding track 106. The sliding track runs in the opening 318 of the C-shape of the wheel holder. The lower side 314 of the wheel holder 310 is positioned under the sliding track. The wheel holder 310 is attached to the door carrier 320. The horizontal part of the door carrier 320 runs under the sliding track 106, in parallel with the sliding track 106. An antiriser 380 prevents the wheel carriage from running off the track, when the wheel carriage 300 runs in the track. The antiriser 380 is removed before replacing the wheels 330.

Figure 6A:
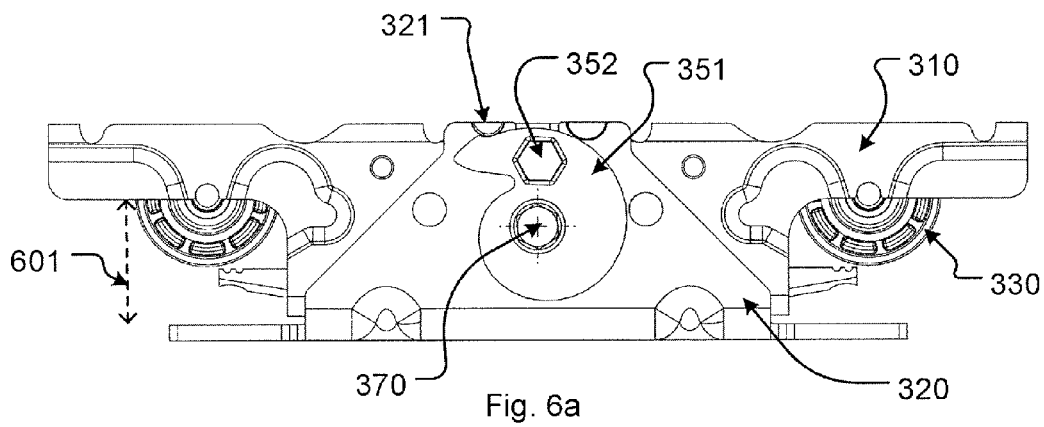
FIGS. 6a-c illustrates height adjustment of a sliding door.
Figure 6B:
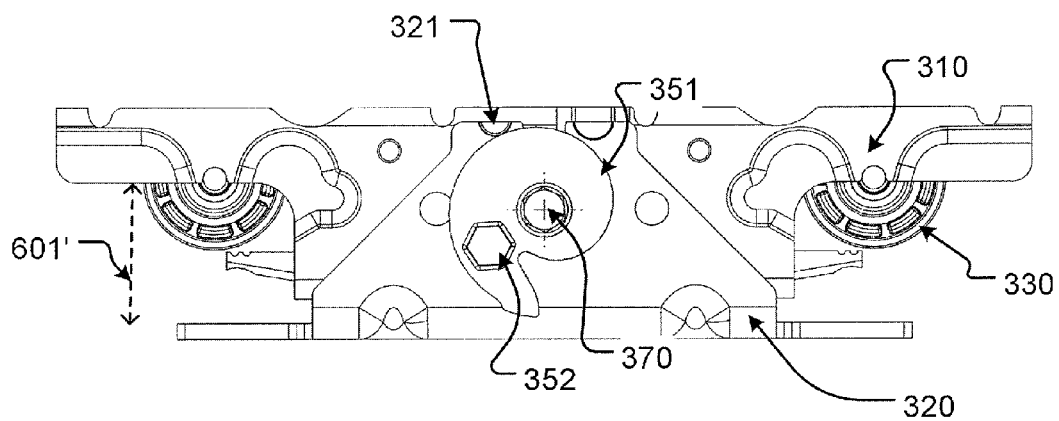
Figure 6C:
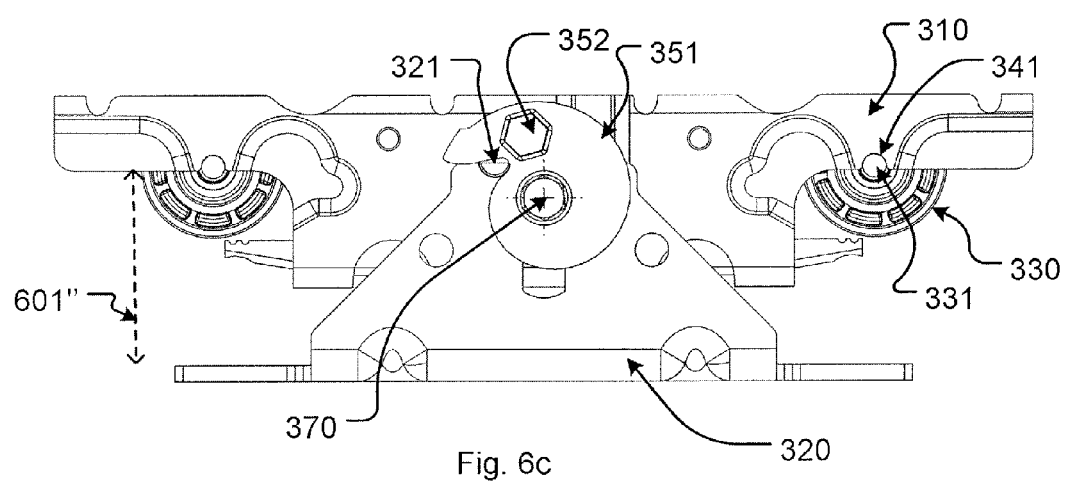

FIGS. 6a-c illustrates height adjustment of a sliding door resting in a sliding track. In FIG. 6a the door panel is in the highest position, i.e. the distance 601 between the door carrier and the wheel carrier is as small as possible. First, the fixation screw 370 needs to be loosened. When the fixation screw 370 is loosened, the door can be height adjusted. This is done by putting a tool at the key grip 352 and rotating the excenter cam disc 351 in a counterclockwise direction. The key grip 352 is equal to the grip of the fixation screw 370. Thereby the same tool can be used. When the excenter cam disc is rotated around the axis 301 (see FIG. 3b), the distance between the fixation screw 370 and the knob 322 changes, due to the excenter cam curve. As the fixation screw 370 is fixed in relation to the wheel holder 310 and the knob 321 is rotatably fixed to the door carrier, when the fixation screw is loosened, the distance between the wheel holder and the door carrier 601 will also change in the same manner. Thereby, the height of the door panel 101 is adjusted. In FIG. 6b the excenter rotation has started and the distance 601' has increased. In FIG. 6c the knob is at the end of the cam curve, i.e. the distance 601 between the door carrier 320 and the wheel holder 310 is maximal. Hence, the door panel 101 is in its lowest position.

Figure 7A:
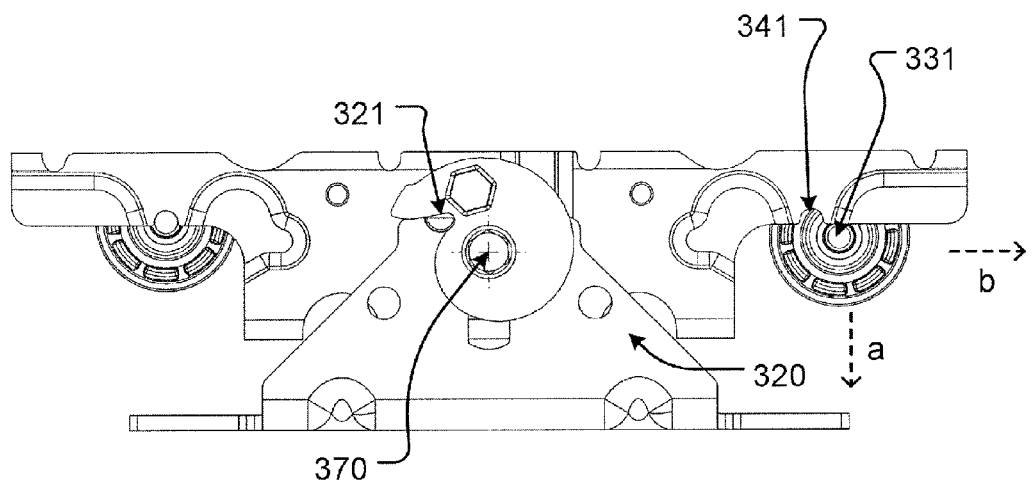
FIGS. 7a-b illustrates removing a wheel from a wheel carriage resting in a sliding track.
Figure 7B:
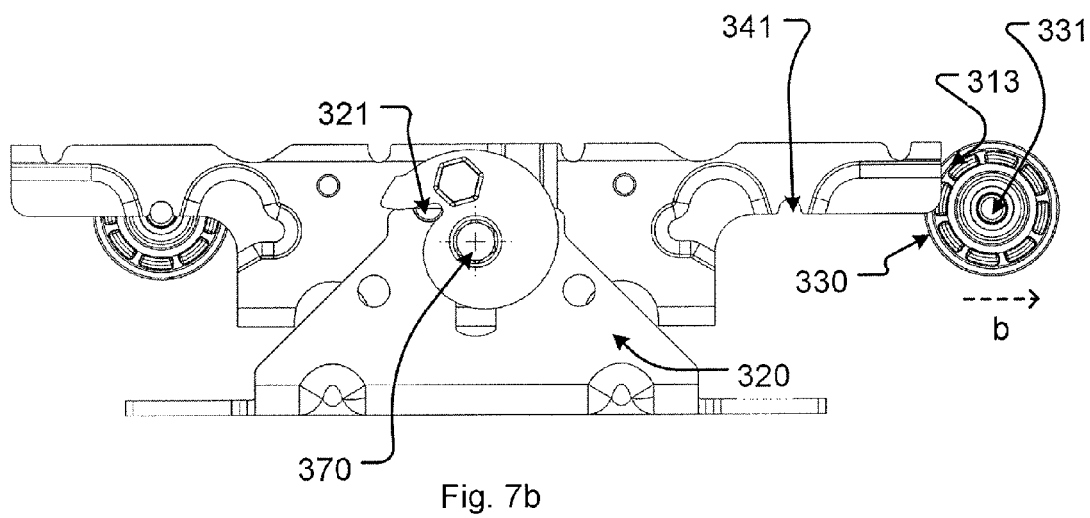

FIGS. 7a-b illustrates how to remove a wheel 330 of the wheel carriage 300 resting in a sliding track. As previously disclosed in FIG. 6c the door panel 101 is lowered such that it rests on the foundation. Hence, the only force holding the wheels is then the gravitation force of the wheel holder 310. As the wheel shaft 331 is fixed in the recesses 331 by the gravitation force, this implies that the wheels 330 can now be easily removed. This is done by lifting the wheel holder slightly, such that the wheel shaft can be removed from the recess 341. The wheel 330 is then removed from the recesses by directing the wheels in direction a. When the wheel shaft is removed from the recesses 341 the wheel 330 can be directed towards and through the short side 313 of the wheel holder 310, in direction b. The tapering parts 316 of the wheel holder 310, provides space for the wheel shafts 331 when directing the wheel 330 towards the short side 313. When the wheel 330 is removed from the wheel holder 310, a new wheel may be inserted in the same manner by directing a wheel through the short side 313 towards the recesses 341. The wheel is then attached by directing the wheel shaft 331 into the recesses 341. Finally, the wheel 330 is fixated by elevating the door panel 101 to such an extent that the weight of the door panels 101 rests on the wheels 330. This is done by rotating the excenter cam disc 351 in a clockwise direction. When requested height is achieved, the fixation screw is tightened such that the door carrier 320, the excenter cam disc 351 and the wheel holder 310 are held in a fixed position.

A second wheel holder will now be described with references made to the FIG. 8-10.

Figure 8A:
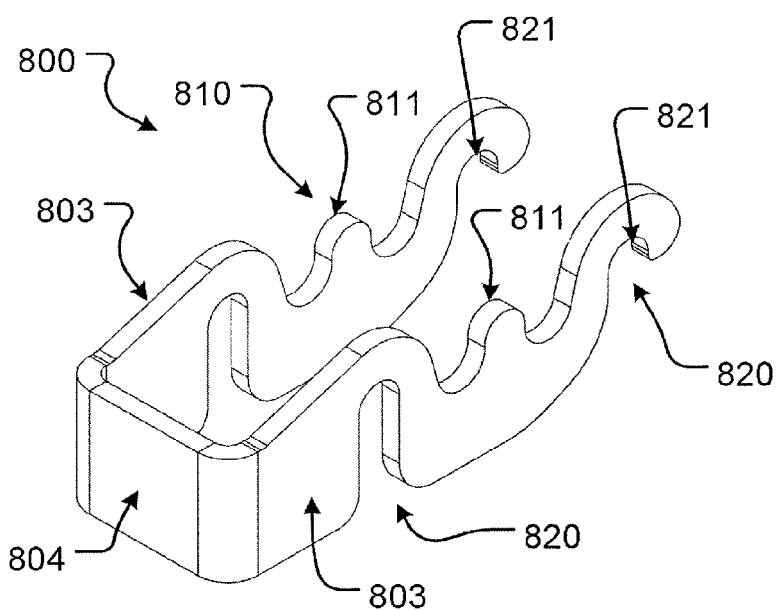
FIG. 8a-c illustrates a second wheel holder.

FIG. 8a discloses a second wheel holder 800 for attaching additional wheels 330 to the wheel carriage 300 described in FIGS. 3-7. It should be noted that the invention is not restricted for use with the wheel holder described in FIGS. 3-7, but the same concept may be applied to other wheel holders in a sliding door systems, where there is a need to increase the number of wheels.

Figure 8B:
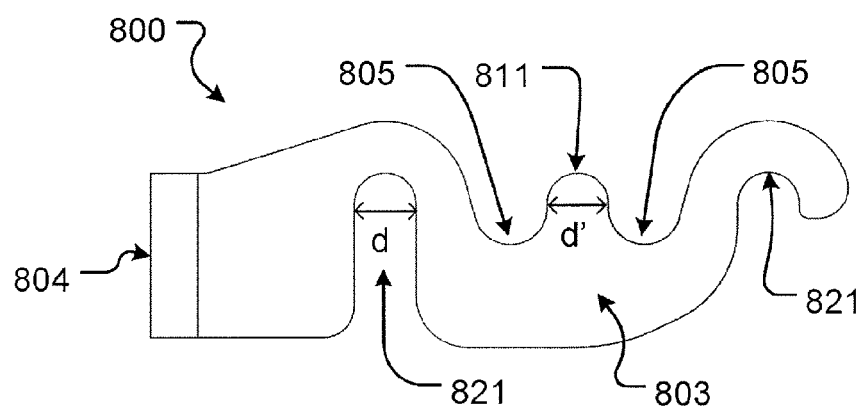
Figure 8C:
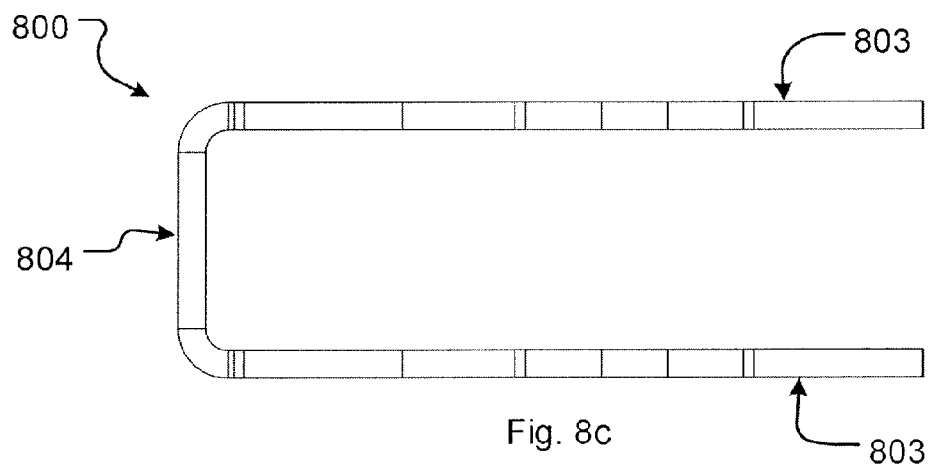

The second wheel holder 800 comprises one attachment means 810, two second wheel connection means 820, two sidewalls 803 and an intermediate wall 804. The second wheel holder 800 is made of a metal sheet bent to a boxlike U-shape. The legs of the U-shape are constituted of the sidewalls 803. The bottom side of the U-shape is constituted by the intermediate wall 804. The other short side, the upper side and the lower side are hollow. FIG. 8b shows the second wheel holder seen from the long side. FIG. 8c shows the second wheel holder seen from the short side.

The end portions of the sidewalls 803 are perpendicularly connected to each side of the intermediate wall 804. The sidewalls 803 and the intermediate wall 804 together form a U-shape when seen from above. The sidewalls 803 have a tapering shape at the ends opposite the intermediate wall 804. The tapering shape enables the second wheel holder 800 to fit inside the wheel carriage 300.

The attachment means 810 is adapted to attach the second wheel holder 800 to one of the first wheel connection means 340 of the wheel carriage 300. The attachment means 810 is formed by two connection points 811 positioned opposite each other at the upper side of each sidewall 803. The connection points 811 are protrusions 811 at the upper edges of each sidewall 803, surrounded by two recesses 805, see FIG. 8b. Each protrusion 811 is adapted to be inserted into the recess 341 of the first wheel connection means 340 of the wheel carriage 300. Hence, the shape of the protrusions 811 correspond to the shape of the recesses 341 of the first wheel connection means 340. This implies that the width (d') of the protrusion 811 is corresponds to the width (d) of the recess 341 of the first wheel connection means 340 (see FIG. 4b) which is corresponding to the width of the wheel shaft.

The second wheel holder comprises two second wheel connection means 820, each adapted to connect one wheel 330. Each second wheel connection means 820 comprises two connection points 821 positioned opposite each other at the lower side of each sidewall 803. The connection points 821 are positioned on opposite sides of the wheel 330, when the wheel 330 is connected. The connection points 821 are recesses 821 in the lower edges of each sidewall 803, see FIG. 8b. Each recess 821 is adapted to receive one end of a wheel shaft 331. The shape of the recesses 821 correspond to the shape of the wheel shaft 330. The depths of the recesses 821 are equal. The second wheel holder may also comprise three or more second wheel connection means 821.

The intermediate wall 804 may also be placed e.g. in the middle of the sidewalls 803. The secondary wheel holder 800 would then form an H-shape when seen from above.

FIG. 9a shows the second wheel holder 800 mounted in a wheel carriage 300 resting in a sliding track 106. The body of the second wheel holder 800 is positioned inside the boxlike shape of the wheel holder 310. The wheel holder 310 has indentations 319 adapted to make space for the second wheel holder 800, see FIGS. 4b and c. The indentations 319 are placed on the inside of each long side 311, one on each side of the recesses 341. The indentations 319 are centered on the position where the wheel shafts will be placed when using a second wheel holder 800 together with the wheel carriage 300. The indentations stretch all the way to the bottom 314 of the wheel holder 310, such that secondary wheel holder 800 with wheels 330 connected, can be directed to its position, see FIGS. 10a-f.

As the wheel shafts 330 and the second wheel holder 800 supports the inside of the wheel holder 310 axially, the use of the second wheel holder 800 stabilises wheel holder 310 in the horizontal direction.

When a second wheel holder 800 is mounted, the protrusions 811 of the attachment means 810 are positioned in the recesses 341 of the first wheel connection means 340 of the wheel holder 310. A wheel 330 is positioned in each of the second wheel connection means 820 of the second wheel holder. Thereby, if two second wheel holders are used, the number of wheels 330 connected to the wheel carriage 300 is increased from two to four. The wheels are added without changing the wheel carriage 300. The second wheel holder 800 does also not affect the height of the wheel carriage 300, including the wheels 330, as the attachment means 810 are located at the same vertical position, represented by the horizontal line 901, as the wheel connection means 820, see FIG. 9b. Therefore, it is also possible to use only one second wheel holder 800, if desired. The wheels 330 and the second wheel holder 800 are held in place by the gravitation force applied by the door blade. During operation of the sliding door, the weight of the door completely rests on the wheels 330 in the sliding track 106. Hence, the distance 601, between the door carrier and the wheel holder, i.e. the sliding track, is small.

Figure 10A:
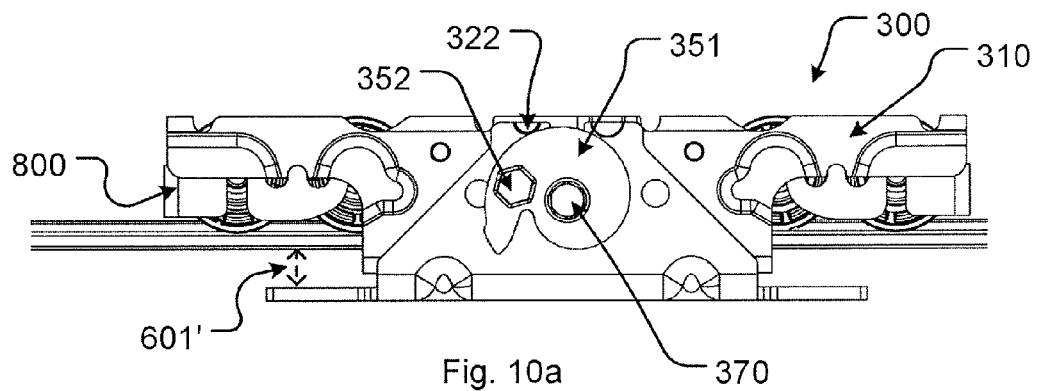
FIG. 10a-f illustrates removal of the second wheel holder and two wheels from a wheel carriage resting in a sliding track.
Figure 10B:
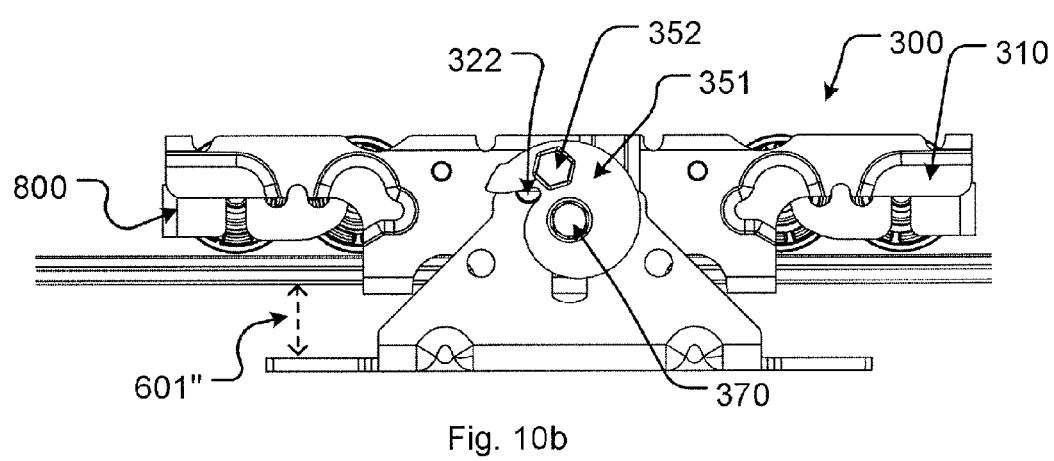
Figure 10C:
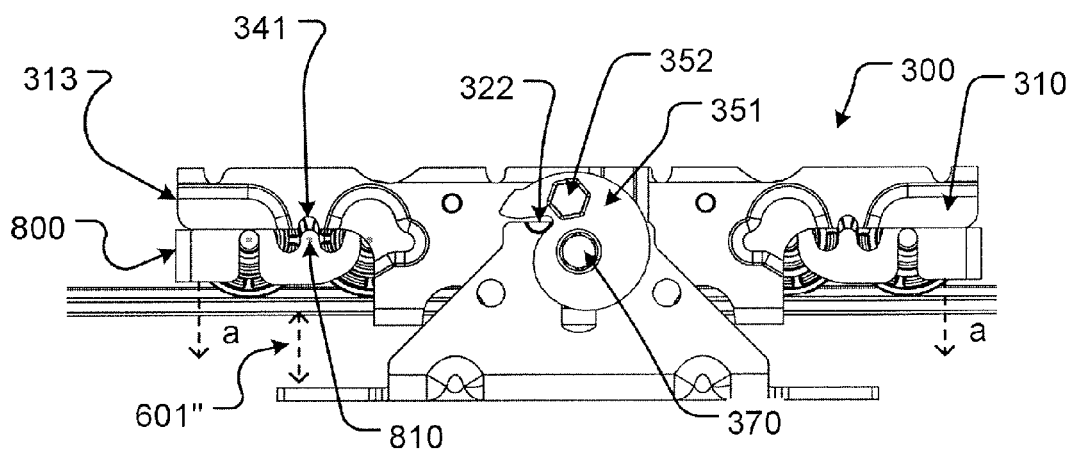
Figure 10D:
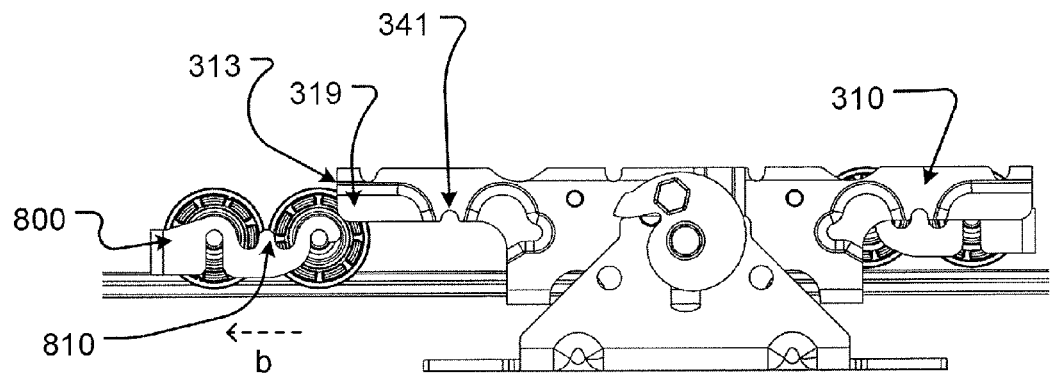
Figure 10E:
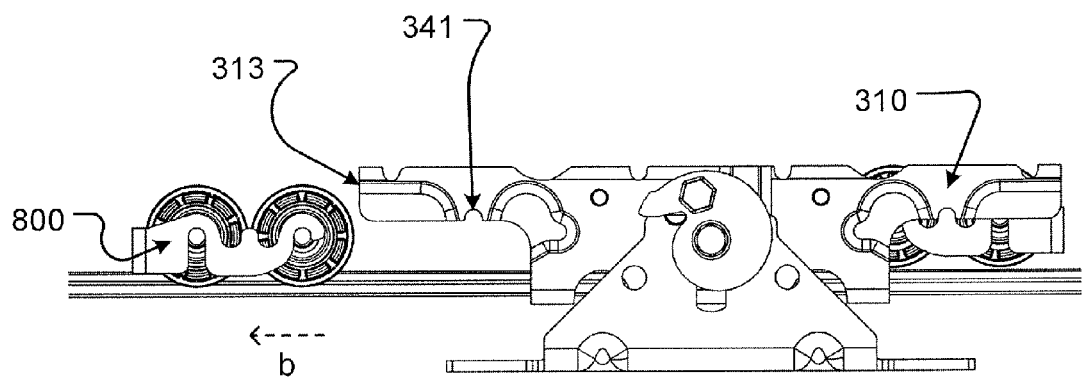
Figure 10F:
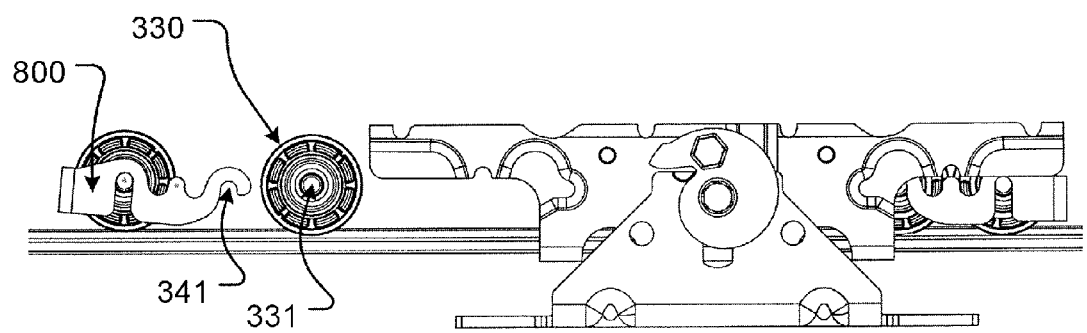

FIGS. 10a and 10e illustrates replacing the wheels in a wheel carriage 300 resting in a sliding track, having a second wheel holder 800.

As previously disclosed in FIG. 9, in normal operation the door panel 101 (not shown) is elevated such that it rests completely in the sliding track 106. In FIG. 9a the door panel is in an elevated position suitable for operation of the sliding door, i.e. the distance 601 between the door carrier and the wheel carrier is small. In order to replace the wheels, the door needs to be lowered. FIGS. 10a and 10b illustrates lowering a sliding door resting in a sliding track, wherein two second wheel holders 800 are attached to the wheel carriage 300. Before height adjustment can start the fixation screw 370 needs to be loosened. When the fixation screw 370 is loosened, the door can be height adjusted. This is done by putting a tool at the key grip 352. The excenter cam disc 351 is then rotated in a counterclockwise direction. The key grip 352 is equal to the grip of the fixation screw 370. Thereby the same tool can be used. When the excenter cam disc 351 is rotated around the axis 301 (see FIG. 3b), the distance between the fixation screw and the knob 322 changes, due to the excenter cam curve. As the fixation screw 370 is fixed in relation to the wheel holder 310 and the knob 321 is fixed to the door carrier, the distance between the wheel holder 310 and the door carrier 601 will also change in the same manner. Thereby, the height of the door panel 101 is adjusted. In FIG. 10a the excenter rotation has started and the distance 601' has increased. In FIG. 10b the knob is at the end of the cam curve, wherein the distance between the rotation axis 301 and the knob 322 is the closest position, i.e. the distance 601" between the door carrier 320 and the wheel holder 310 is maximal. Hence, the door panel 101 is in its lowest position. The door panel 101 now rest on the foundation.

As disclosed in FIG. 10b the door panel 101 is lowered such that it rests on the foundation. Hence, the force holding the wheels and the second wheel holder 800 is mainly the gravitation force of the wheel holder 310. As the wheel shaft 331 is fixed in the recesses 331 by the gravitation force, this implies that the wheels 330 and the second wheel holder 800 can now be easily removed. This is done by lifting the wheel holder 310 slightly, such that the protrusions 811 can be removed from the recesses 341. The second wheel holder 800, including the wheels 330, is then removed from the recesses 341 by directing the second wheel holder 800 downwards, in direction a, as disclosed in FIG. 10c. When the protrusions 811 are removed from the recesses 341, the second wheel holder 800 and the wheels can be directed towards and through the short side 313 of the wheel holder 310, in a direction b, as disclosed in FIGS. 10d and 10e.

The tapering parts 316 (see FIG. 4b) and the indentations 319 of the wheel holder 310, provides space for the second wheel holder 800 and the wheel shafts 331 when directing the second wheel holder 800 towards the short side 313 of the wheel carriage 300. When the second wheel holder 800 is removed from the wheel holder 310, the wheels 330 can easily be replaced by removing them from the second wheel connection means 820, see FIG. 10f. The second wheel holder 800 may then be inserted in the wheel carriage 300 by directing the second wheel holder 800 including new wheels 330 through the short side 313 towards the recesses 341. The second wheel holder 800 is then reattached by placing the protrusions 811 in the recesses 341. Finally, the second wheel holder 800 and the wheels 330 are fixated by elevating the door panel 101 to such an extent that the weight of the door panels 101 rests on the wheels 330. This is done by rotating the excenter cam disc 351 in a clockwise direction. When requested height is achieved, the fixation screw is tightened such that the door carrier 320, the excenter cam disc 351 and the wheel holder 310 are held in a fixed position.

Due to limited space between the first wheel holder 310 and the door carrier 320, it may be difficult or impossible to remove the second wheel holder 800 with the wheels attached. The inner wheel 330 then has to be disconnected inside the wheel carriage, in order to be able to remove the second wheel holder 800. The second wheel holder 800, including one wheel, is then removed first. The second wheel is removed after removing the second wheel holder. Insertion is then done in the same way.

Figure 11:
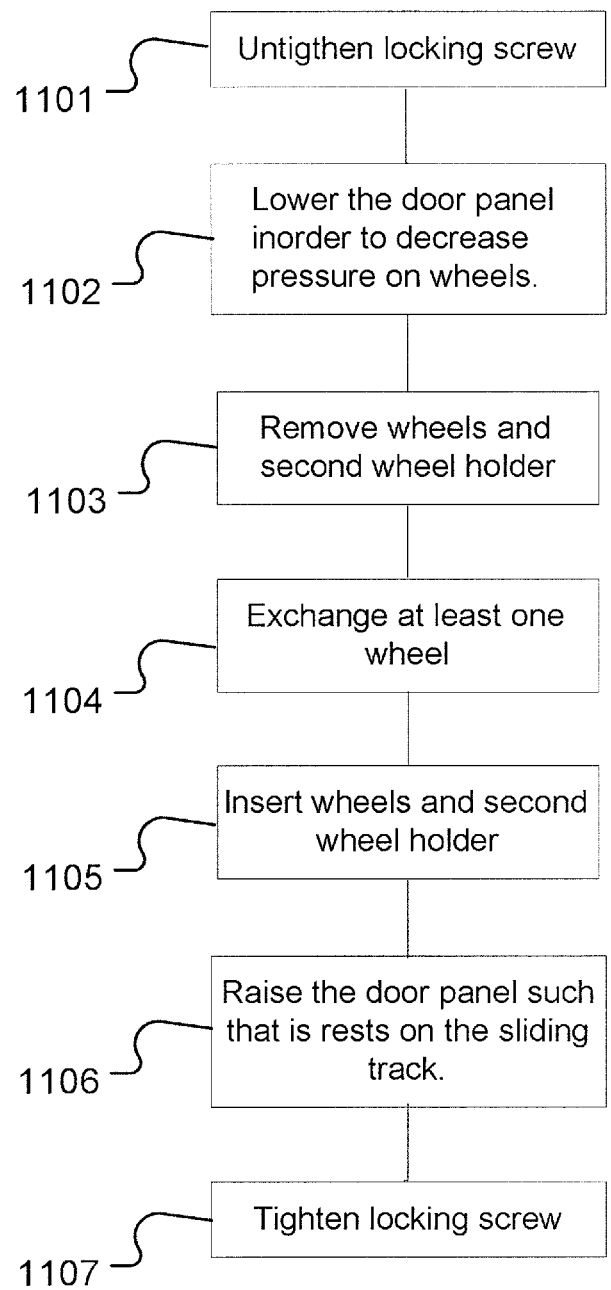
FIG. 11 illustrates a method for replacing the wheels of a sliding door carriage comprising a second wheel holder.

FIG. 11 discloses the method for exchanging the wheels 300 in a wheel carriage 330 in a flowchart. In the first step 1101, the fixation screw 370 is untightened. The wheel holder 310 is then slidable in relation to the door carrier 320. In the next step 1102 the door panel 101 is lowered until the weight of the door panel 101 partly rests on the foundation. This is done by rotating the excenter cam disc 351 around the axis 301 in a counterclockwise direction. The wheels are mainly held in place by the weight of the wheel carriage 300.

In step 1103 the wheels and second wheel holder are removed. This is done by lifting the wheel carriage 300, and removing the second wheel holder 800 and the wheels 330 through the short side 313 of the wheel carriage 300, see FIG. 10d-10e. When the second wheel holder 800 is removed, the wheels can easily be exchanged, step 1104. The second wheel holder 800 and the wheels 330 are then inserted through the short side 313 and the protrusions 811 of the attachment means 810 are positioned in the recesses 341 of the first wheel connection means 340, step 1105. The same procedure may be performed for one or several wheels. When the wheel or wheels 330 are replaced, the door panel 101 is elevated to a desired position, step 1106. The door panel 101 is elevated at least to such an extent that it rests in the sliding track 106. Finally, the locking screw 307 is tightened as disclosed in step 1107.

The foregoing has described the principles, preferred embodiments and modes of operation of the present invention. However, the description should be regarded as illustrative rather than restrictive, and the invention should not be limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. In a wheel carriage for holding a sliding door running in a sliding track, the wheel carriage comprising a first wheel connection means and a second wheel connection means each adapted to connect one wheel to the wheel carriage, the improvement comprising a supplemental wheel holder for adding at least one additional wheel to the wheel carriage, comprising:
- a. a body having a first attachment means adapted to be removably attached to one or both of the first and second wheel connection means and
- b. a third and fourth wheel connection means each adapted to connect one wheel.

2. The supplemental wheel holder according to claim 1, wherein the third and fourth wheel connection means comprise two connection points, adapted to be connected to opposite sides of the wheel.

3. The supplemental wheel holder according to claim 1, wherein the third and fourth wheel connection means and the first attachment means are horizontally aligned.

4. The supplemental wheel holder according to claim 1, wherein the body has an upper side and a lower side and wherein the first attachment means comprises at least one protrusion on the upper side of the body with a width corresponding to the thickness of a wheel shaft.

5. The supplemental wheel holder according to claim 1, wherein the body has an upper side and a lower side, and wherein the third and fourth wheel connection means each comprise at least one recess formed at the lower side of the body with a width corresponding to the thickness of a wheel shaft.

6. A supplemental wheel holder according to claim 1, wherein the body further comprises:
- a. one intermediate wall, comprising two ends,
- b. two parallel sidewalls, and
- c. wherein a first end of the intermediate wall is connected to one of the two parallel sidewalls and the second end of the intermediate wall is connected to the second of the two parallel side walls.

7. The supplemental wheel holder according to claim 6, wherein the first attachment means comprises one protrusion on the upper side of each sidewall with a width corresponding to the thickness of a wheel shaft.

8. The supplemental wheel holder according to claim 6, wherein the third and fourth wheel connection means comprise at least one recess in the lower side of each sidewall with a width corresponding to the thickness of a wheel shaft.

9. The supplemental wheel holder according to claim 1, wherein the body has a U-shape.

10. The supplemental wheel holder according to claim 1, wherein the third and fourth wheel connection means is adapted to attach the wheel by the gravitation force generated by a door panel attached to the wheel carriage.

11. The supplemental wheel holder according to claim 1, wherein the first attachment means is adapted to be attached to the wheel carriage by the gravitation force generated by a door panel attached to the wheel carriage.

12. The supplemental wheel holder according to claim 1, wherein the body is made from one piece of metal sheet.

13. A wheel carriage for a sliding door resting in sliding track, comprising:
- a. a wheel holder comprising at least a first and second wheel connection means, each adapted to removably connect one wheel, and
- b. a door carrier, movably connected to the wheel holder and adapted to be attached to the upper part of a door panel, wherein the wheel carriage further comprises the supplemental wheel holder according to claim 1.

14. A wheel carriage according to claim 13 wherein the third and fourth wheel connection means comprises two connection points adapted to be connected on opposite sides of the wheel.

15. A wheel carriage according to claim 13, wherein the first attachment means is adapted to be attached to the supplemental wheel holder by the gravitation force of a door panel attached to the door carrier and the third and fourth wheel connection means is adapted to be attached to the wheels by the gravitation force of the door panel attached to the door carrier.

16. A method for exchanging wheels of a wheel carriage resting in a sliding track, said wheel carriage comprising one wheel holder, at least one supplemental wheel holder according to claim 1, at least two wheels and one door carrier; wherein the wheel holder comprises a first wheel connection means and a second wheel connection means removably connected to a wheel or the supplemental wheel holder at two connection points, wherein the connection points are connected on opposite sides of the wheel or of the supplemental wheel holder, wherein the third and fourth wheel connection means are removably connected to a wheel; and wherein the door carrier is attached to a door panel, comprising the steps:
- a. lowering the door panel in a vertical direction to such an extent that the wheels are removable from the wheel holder,
- b. removing at least one supplemental wheel holder and at least two wheels,
- c. replacing at least one wheel,
- d. inserting the at least one supplemental wheel holder and at least two wheels, and
- e. elevating the door panel so that the weight of the door panel rests in the sliding track.

17. A method for exchanging wheels of a wheel carriage resting in a sliding track, said wheel carriage comprising one wheel holder, at least two wheels, and one door carrier; wherein the wheel holder comprises a first wheel connection means and a second wheel connection means removably connected to a wheel at two connection points, wherein the connection points are connected on opposite sides of the wheel; and wherein the door carrier is attached to a door panel, comprising the steps:
- a. lowering the door panel in a vertical direction to such an extent that the wheels are removable from the wheel holder,
- b. removing at least one wheel,
- c. inserting at least one supplemental wheel holder according to claim 1 and at least two wheels, and
- d. elevating the door panel so that the weight of the door panel rests in the sliding track.

* * * * *